United States Patent [19]

Morlino et al.

[11] Patent Number: 5,390,940
[45] Date of Patent: Feb. 21, 1995

[54] KEYLESS CHUCK WITH INTEGRAL THREADED RING

[75] Inventors: John J. Morlino, Clemson; John L. Wilson, Belton, both of S.C.

[73] Assignee: Jacobs Chuck Technology Corporation, Wilmington, Del.

[21] Appl. No.: 67,686

[22] Filed: May 26, 1993

[51] Int. Cl.$^6$ .............................................. B23B 31/12
[52] U.S. Cl. ....................................... 279/62; 279/902
[58] Field of Search ................................... 279/60–65, 279/158, 902

[56] References Cited

U.S. PATENT DOCUMENTS

| | | |
|---|---|---|
| 847,336 | 3/1907 | Holmberg . |
| 896,052 | 8/1908 | Ashley .................... 279/62 |
| 1,053,530 | 2/1913 | North . |
| 4,991,860 | 2/1991 | Röhm ................... 279/61 X |
| 5,125,673 | 6/1992 | Huff et al. ............ 279/62 X |
| 5,145,192 | 9/1992 | Röhm . |
| 5,145,193 | 9/1992 | Röhm . |
| 5,219,174 | 6/1993 | Zurbrügg et al. ..... 279/158 X |

FOREIGN PATENT DOCUMENTS 3411127 10/1985 Germany ...................... 279/62

*Primary Examiner*—Steven C. Bishop
*Attorney, Agent, or Firm*—Dority & Manning

[57] ABSTRACT

A chuck for use with a manual or power driver having a rotatable drive shaft. The chuck includes a generally cylindrical body member with a nose section and a tail section. The tail section has an axial bore formed therein to mate with the drive shaft of the driver, and the nose section has an axial bore therein and a plurality of annularly disposed passageways formed therethrough and intersecting the axial bore for receipt of a plurality of jaws slidably positioned therein. The chuck further includes a generally cylindrical front sleeve member overlaying the nose section of the body member and rotatable with respect thereto. The front sleeve member includes a threaded nut portion integral therewith and in engagement with the threads on the jaws such that when the front sleeve member is rotated with respect to the body member, the jaws will be advanced or retracted, depending on the direction of rotation.

15 Claims, 2 Drawing Sheets

KEYLESS CHUCK WITH INTEGRAL THREADED RING

BACKGROUND OF THE INVENTION

The present invention relates generally to drill chucks for use with hand drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction relative to the shaft forces the jaws into gripping relationship with respect to the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

Despite the success of keyless chucks such as set forth in U.S. Pat. No. 5,125,673, varying configurations of keyless chucks are desirable for a variety of applications. For example, it would be desirable to have a keyless chuck that requires fewer components or lower manufacturing cost. In addition, in particular environments such as, for example, use in a surgical environment, fewer parts, and specific preferred materials could be beneficial. Further, a chuck in accordance with the present invention could be produced to be disposable if desired.

SUMMARY OF THE INVENTION

The present invention recognizes and addresses the foregoing considerations, and others of prior art constructions and methods.

Accordingly, it is an object of the present invention to provide an improved keyless chuck.

It is another object of the present invention to provide a keyless chuck that may be lighter in weight than a conventional keyless chuck.

It is another object of the present invention to provide a keyless chuck that is particularly adapted for environments requiring clean or sterile operation such as surgery or the like.

It is another object of the present invention to provide a keyless chuck that has a minimum number of individual components.

It is a further object of the present invention to provide a chuck that reduces monetary costs and could be disposable if desired.

These and other objects of the present invention are achieved by providing a chuck for use with a manual or power driver having a rotatable drive shaft wherein the chuck comprises a generally cylindrical body member having a nose section and a tail section. The tail section has an axial bore formed therein to mate with the drive shaft of the driver and the nose section has an axial bore formed therein and a plurality of angularly disposed passageways formed therethrough and intersecting the axial bore. The chuck further includes a plurality of jaws slidably positioned in the angularly disposed passageways, each of the jaws having a jaw face formed on one side thereof and threads formed on the opposite side thereof. The chuck further includes a generally cylindrical front sleeve member overlaying the nose section of the body member and rotatable with respect thereto. The front sleeve member includes a threaded nut portion integral therewith and in engagement with the threads on the jaws such that when the front sleeve member is rotated with respect to the body member, the jaws will be moved.

The body member of the chuck may include a thrust ring integral therewith which may include a plurality of jaw guideways to permit retraction of the jaws therethrough.

The above and other objects may also be achieved by providing an improved front sleeve for a drill chuck having a generally cylindrical body member with a nose section and a tail section. The tail section has an axial bore formed therein to mate with a drive shaft of a manual or power driver and the nose section has an axial bore formed therein and a plurality of angularly disposed passageways formed therethrough and intersecting the axial bore. The chuck may also have a plurality of jaws slidably positioned in the angularly disposed passageways, each of the jaws having a jaw face formed on one side thereof and threads formed on the opposite side thereof. The front sleeve member includes a threaded nut portion integral with the sleeve and adapted to engage the threads on the jaws when the front sleeve member is rotatably received on the body member. When the present invention is adapted specifically for use in a sterile environment such as surgery, some or all of the components may be constructed of stainless steel or other material capable of being sterilized.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
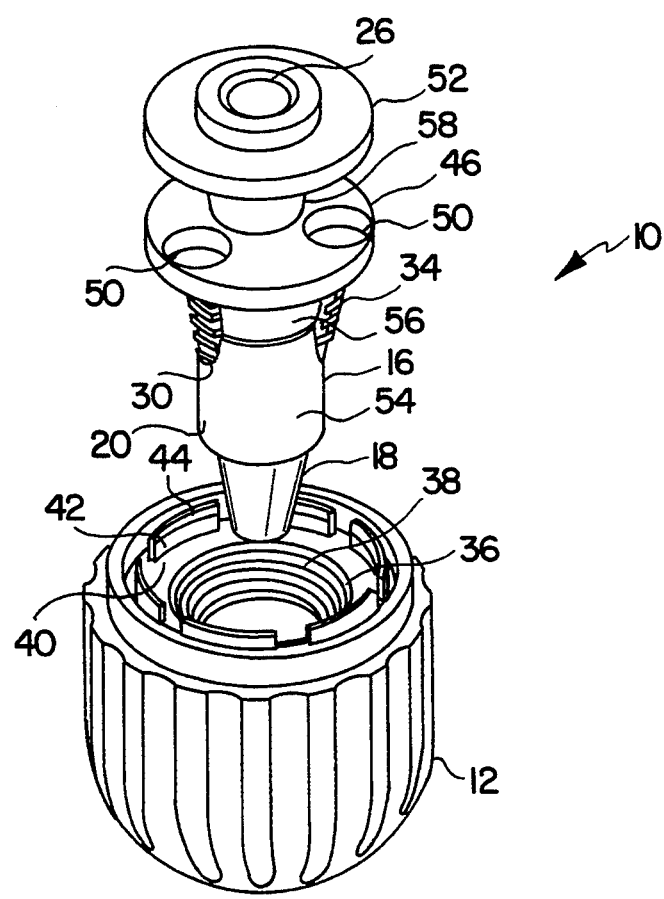
FIG. 1 is a perspective view of a chuck body, jaws and front sleeve member prior to final assembly in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
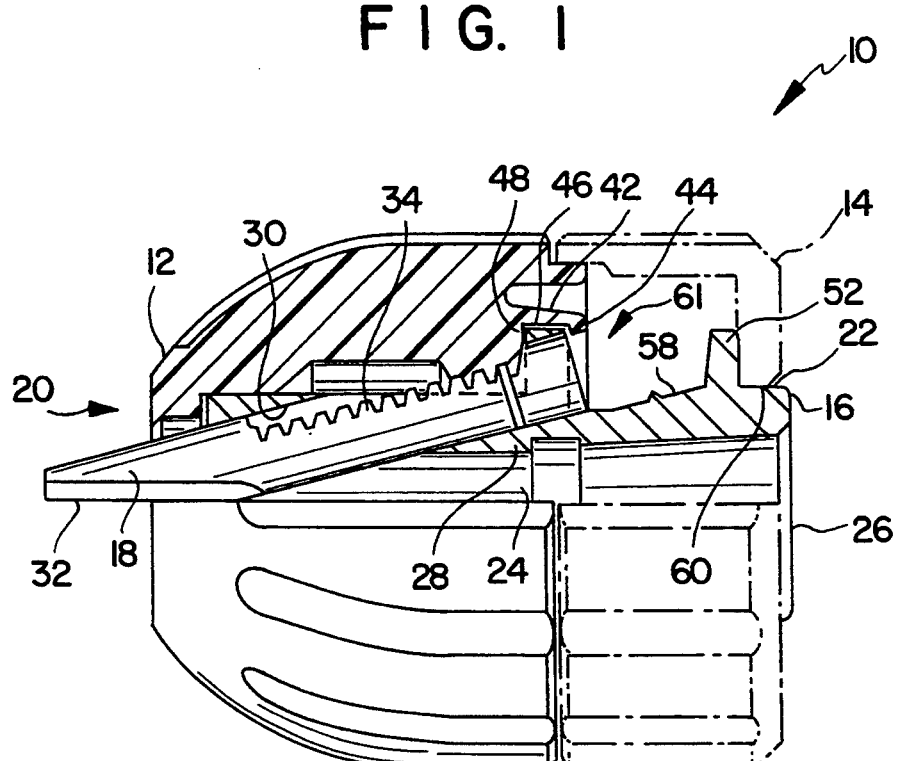
FIG. 2 is a side partially cross-sectioned view of a chuck in accordance with an embodiment of the present invention.

Referring to FIGS. 1 and 2, a chuck 10 in accordance with the present invention is illustrated. Chuck 10 includes a front sleeve member 12, an optional rear sleeve member 14 (illustrated only in FIG. 2), a body member 16 and jaws 18. Body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A tapered bore 26 is formed in tail section 22 of body 16 and is of a standard size to mate with the drive shaft of a powered or hand driver (not shown). The bores 24, 26 may communicate at the central region 28 of body member 16. While a tapered bore 26 is illustrated, such bore could be replaced with a threaded bore of a standard size to mate with a threaded drive shaft.

Passageways 30 are formed in body member 16 to accommodate each jaw 18. Preferably, three jaws 18 are employed and each jaw 18 is separated from the adjacent jaw by an arc of approximately 120 degrees. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. Threads 34 may be, for example, of the buttress thread form and may be of a relatively fine pitch. However, various thread types and pitches may be utilized within the scope of the present invention as would be readily apparent to one skilled in the art.

Front sleeve 12 includes an integral nut 36 formed thereon in a unitary manner and preferably of the same material as front sleeve 12. Integral nut 36 includes female threads 38 and thrust face 40. Integral nut 36 also includes means for preventing axial movement of the front sleeve member with respect to the body portion. As embodied herein and illustrated in FIG. 2, the means for preventing axial movement includes protrusions 42 with locking tabs 44 thereon. Front sleeve 12 is adapted to be fitted over the nose section 20 of body member 16 and secured thereon rotatably with respect to body member 16 with the female threads 38 of unitary nut 36 mating with threads 34 of jaws 18 as will be described in more detail below.

As illustrated in FIGS. 1 and 2, body member 16 includes a thrust ring member 46 which, in a preferred embodiment, may be integral therewith. Thrust ring member 46 includes thrust face 48 adapted to engage thrust face 40 of integral nut 36 for creating a bearing interface between body member 16 and front sleeve member 12 that rotates with respect thereto. Thrust ring member 46 includes a plurality of jaw guideways 50 formed around the circumference to permit retraction of the jaws 18 therethrough.

Body member 16 further includes a rear annular member 52 which, in a preferred embodiment, may be integral therewith. Rear annular member 52 is adapted to assist in securing optional rear sleeve member 14 onto chuck body member 16.

As best illustrated in FIGS. 1 and 2, chuck body member 16 includes a substantially cylindrical outer surface portion 54, a first tapered portion 56 extending between the cylindrical outer surface portion 54 and thrust ring member 46. Body member 16 also includes a second tapered portion 58 extending between thrust ring member 46 and rear annular member 52. Optional rear sleeve member 14 includes a bore 60 adapted to mate with tail section 22 of body member 16. In a preferred embodiment, as best illustrated in FIG. 2, the configuration of the bore of optional rear sleeve member 14 and the tail or rearward section of body 22 forms an annular open space 61 when the optional rear sleeve member is secured to body member 16 so that when jaws 18 are retracted within chuck 10, the rear sleeve member of 14 will not interfere with their movement. If desired, the rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. In addition, the front and rear sleeve members, as well as the other components of the chuck, may be fabricated from stainless steel for use in an environment requiring sterilization such as medical surgery or the like, or may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16 while front sleeve member 12 with integral nut 36 is attached to body member 16 for relative rotation therewith. Relative movement of the front and rear sleeve members, 12 and 14, due to the interaction between threads 34 on jaws 18 and threads 38 on integral nut 36 causes jaws 18 to be advanced or retracted, depending upon the direction of relative movement.

While thrust face 40 and thrust face 48 are configured for relative movement with respect to each other in contact, it should be appreciated that bearings could be provided between these surfaces to minimize friction as would be apparent to one skilled in the art. It should also be appreciated that coatings could be applied or materials with friction minimizing characteristics such as teflon or the like could be utilized to minimize the frictional aspects of the interaction between thrust face 48 and thrust face 40.

Figure 3:
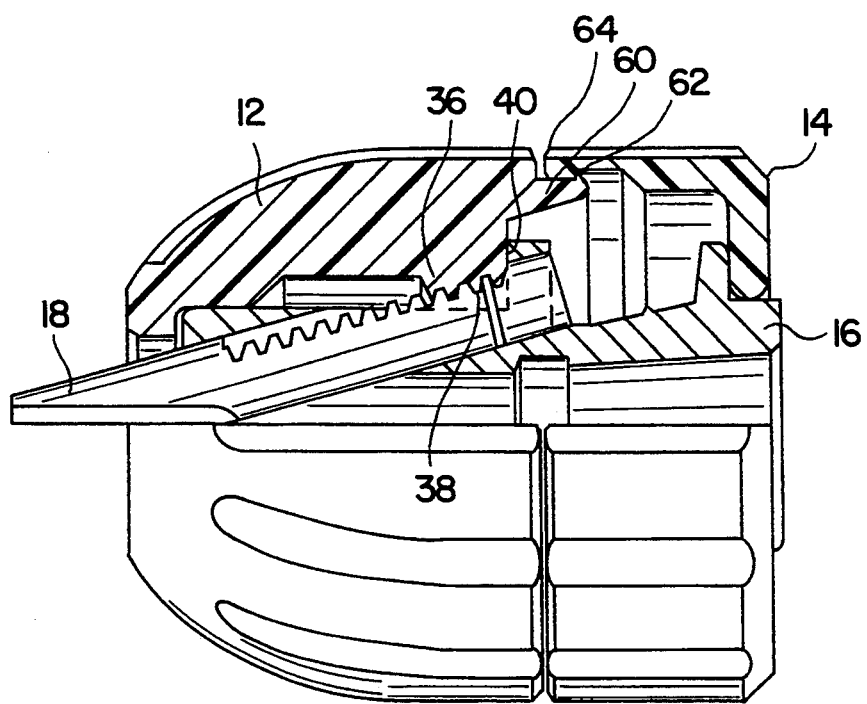
FIG. 3 is a side partially cross-sectioned view of a chuck in accordance with an alternate embodiment of the present invention.

Referring to FIG. 3, an alternate embodiment of a chuck 10 in accordance with the present invention is illustrated. The embodiment of FIG. 3 is substantially identical to the embodiment of FIG. 2 with the exception that integral nut 36 with female threads 38 and thrust face 40 does not have protrusions as illustrated at 42 and 44 in FIGS. 1 and 2. Instead, front sleeve member 12 includes means for preventing axial movement of the front sleeve member with respect to body member 16, which are embodied therein as annular protrusions 60 with locking tabs 62 adapted to engage with tabs 64 on rear sleeve member 14 for locking engagement therewith. In the embodiment of FIG. 3, locking tabs 62 engage locking tabs 64 and rotate with respect thereto so as to prevent axial movement of front sleeve 12 with respect to rear sleeve member 14 which is fixedly attached to body member 16.

The chuck in accordance with the present invention has a number of advantages with respect to ease and cost of manufacture. The integral nut 36 can be manufactured if desired in the same step as front sleeve member 12. In addition, when use is desired in sterile or the like environments such as, for example, surgery, the number of moving components, which increase the difficulty of obtaining sterile tools, is minimized. Therefore, it is possible that a chuck in accordance with the present invention could be resterilized for repeated use, or the manufacturing cost minimized because of the present invention to the point where such chuck could be considered a disposable component as is common with many medical devices today. In addition, any type suitable material could be utilized for construction of the chuck including varying materials for varying components thereof. Such material variations would be dependent on the end use of the chuck and the desired operating characteristics.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   a plurality of jaws slidably positioned in said angularly disposed passageways, each of said laws having a jaw face formed on one side thereof and threads formed on the opposite side thereof;
   a generally cylindrical front sleeve member overlaying said nose section of said body member and rotatable with respect thereto, said front sleeve member including a threaded nut portion integral therewith and in engagement with said threads on said jaws such that when said front sleeve member is rotated with respect to said body member, said jaws will be moved thereby; and
   wherein said body member includes a thrust ring.

2. A chuck for use with a manual or powered driver having a rotatable drive shaft as in claim 1, wherein said thrust ring is integral with said body.

3. A chuck for use with a manual or powered driver having a rotatable drive shaft as in claim 1, wherein said thrust ring includes a plurality of jaw guideways to permit retraction of the jaws therethrough.

4. A chuck for use with a manual or powered driver having a rotatable drive shaft as in claim 1, wherein said nut portion of said front sleeve member includes a bearing surface formed thereon.

5. A chuck for use with a manual or powered driver having a rotatable drive shaft as in claim 1, wherein said thrust ring includes a bearing surface formed thereon.

6. A chuck for use with a manual or powered driver having a rotatable drive shaft as in claim 5, wherein said nut portion of said front sleeve member includes a bearing surface formed thereon, said bearing surface being adapted for contact with said bearing surface formed on said thrust ring.

7. A chuck for use with a manual or powered driver having a rotatable drive shaft as in claim 1, wherein said front sleeve member includes means for preventing axial movement of said front sleeve with respect to said body.

8. A chuck for use with a manual or powered driver having a rotatable drive shaft as in claim 7, wherein said means for preventing axial movement includes protrusions adapted to contact said thrust ring.

9. A chuck for use with a manual or powered driver having a rotatable drive shaft as in claim 1, wherein said chuck includes a rear sleeve member fixed on said tail section of said body member and further including means for preventing axial movement of said front sleeve, wherein said means for preventing axial movement including a portion adapted to matingly engage said rear sleeve.

10. A chuck for use with a manual or powered driver having a rotatable drive shaft, said chuck comprising:
    a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
    a plurality of jaws slidably positioned in said angularly disposed passageways, each of said jaws having a jaw face formed on one side thereof and threads formed on the opposite side thereof:
    a generally cylindrical front sleeve member overlaying said nose section of said body member and rotatable with respect thereto, said front sleeve member including a threaded r ،t portion integral therewith and in engagement ،with said threads on said jaws such that when said front sleeve member is rotated with respect to said body member, said jaws will be moved thereby; and
    further comprising a generally cylindrical rear sleeve member fixed on said tail section of said body member.

11. An improved generally cylindrical front sleeve for a drill chuck having a generally cylindrical body member with a nose section and a tail section, said tail section having an axial bore formed therein to mate with a drive shaft of a manual or powered driver and said nose section having an axial bore formed therein and a plurality of angularly disposed passageways formed therethrough and intersecting said axial bore, said chuck also having a plurality of jaws slidably positioned in said angularly disposed passageways, each of said jaws having a jaw face formed on one side thereof and threads formed on the opposite side thereof, said generally cylindrical front sleeve member including:

a threaded nut portion integral with said sleeve and adapted to engage said threads on said jaws when said front sleeve member is rotatably received on said body member, said threaded nut portion including protrusions with locking tab portions for securing said front sleeve to said body member.

12. An improved front sleeve member as set forth in claim 11 above, wherein said nut portion includes a bearing surface thereon for engagement with a portion of said body member.

13. An improved front sleeve member as set forth in claim 11 above, wherein said body member includes a thrust ring thereon and wherein said locking tab portions are adapted to be received on said thrust ring.

14. An improved front sleeve member as set forth in claim 11 above, wherein said front sleeve member is constructed of stainless steel.

15. An improved front sleeve member as set forth in claim 11 above, wherein said front sleeve member is constructed of a composite material.

* * * * *

UNITED STATES PATENT AND TRADEMARK OFFICE
CERTIFICATE OF CORRECTION

PATENT NO. : 5,390,940

DATED : February 21, 1995

INVENTOR(S) : Morlino et al.

It is certified that error appears in the above-identified patent and that said Letters Patent is hereby corrected as shown below:

In Column 5, line 52, please delete "laws" and replace with --jaws--.

Signed and Sealed this

Twenty-third Day of May, 1995

*Attest:*

BRUCE LEHMAN

*Attesting Officer*     *Commissioner of Patents and Trademarks*